Patented Feb. 27, 1951

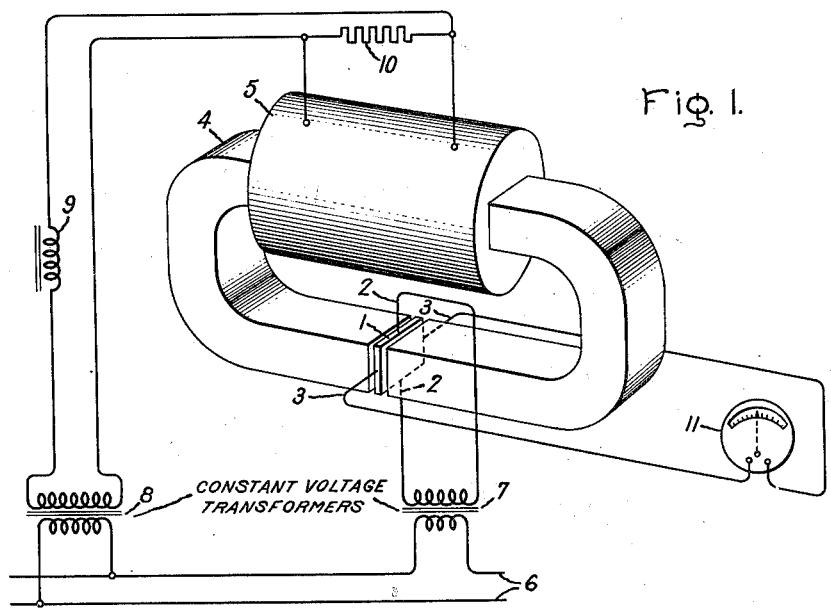
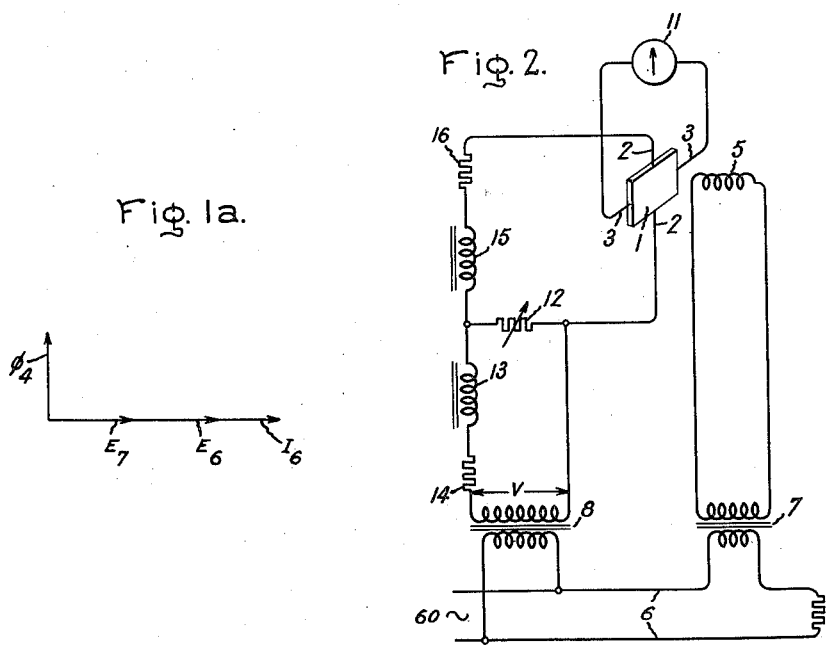
Inventors:
Norval P. Millar,
Russell A. Warner,
by Prowell S. Mack
Their Attorney.

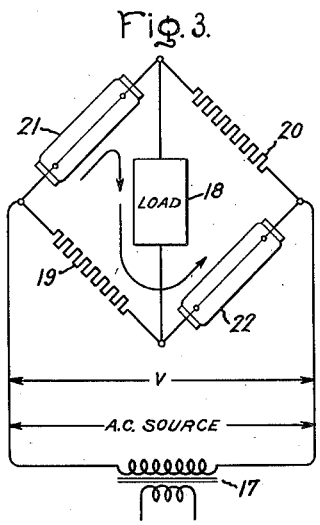
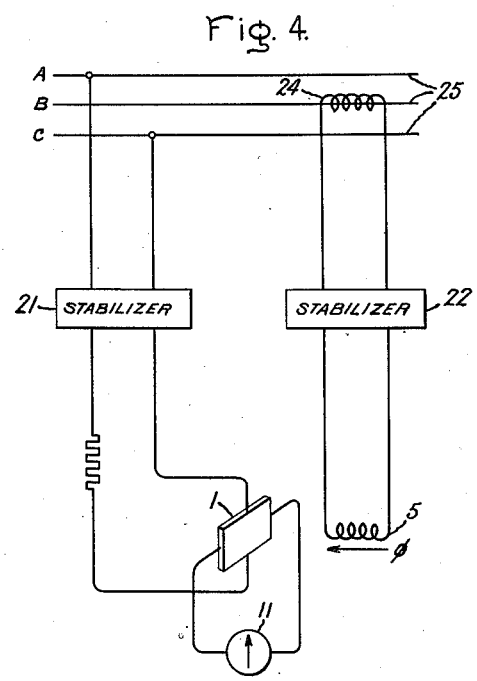

2,543,640

UNITED STATES PATENT OFFICE 2,543,640

PHASE COMPARATOR UTILIZING HALL EFFECT

Norval P. Millar, Danvers, Mass., and Russell A. Warner, Schenectady, N. Y., assignors to General Electric Company, a corporation of New York Application May 25, 1949, Serial No. 95,256

4 Claims. (Cl. 172—245)

1

Our invention relates to phase angle or power factor measuring apparatus and its object is to provide a low-cost, high accuracy measuring apparatus of this class which is free from errors due to variations in voltage or current of the circuit being investigated.

In carrying our invention into effect, we employ a Hall plate having an alternating current field, an alternating current input circuit, and direct current output circuit, the latter connected to a sensitive direct current instrument graduated in phase angle or power factor. The alternating current field and current input circuits are supplied from the source being metered through devices which supply constant voltages, and in one of the input circuits there is provided a phase shifting impedance which provides for a 90-degree phase relation between the alternating current inputs to the Hall plate when the power factor of the metered circuit is known and is at or near unity.

The features of our invention which are believed to be novel and patentable will be pointed out in the claims appended hereto. For a better understanding of our invention reference is made in the following description to the accompanying drawings in which in Fig. 1 a perspective view of our improved power factor measuring apparatus and its circuit connections for measuring the power factor of a single phase power circuit is shown. Fig. 1A is a vector diagram explanatory of Fig. 1. Fig. 2 is another design of the single phase power factor measuring apparatus of our invention. Fig. 3 is a form of voltage regulator that may be used with our invention, and Fig. 4 illustrates our invention as applied to a balanced voltage three phase system.

In the drawing, Fig. 1, 1 represents a rectangular Hall plate having input current terminals 2 at the centers of opposite edges and output voltage terminals 3 at the centers of the other opposite edges. The Hall plate is positioned in the air gap of an electromagnet having a magnetic yoke 4 and an energizing coil 5. The current input terminals 2 of the Hall plate are energized by a voltage which is in phase with the current of a power circuit 6. Such voltage is taken from the secondary of a transformer 7 the primary of which carries the current of power circuit 7. The transformer 7 is of special construction, it having a saturable core, such that the secondary voltage is constant over a wide range of primary current and has a fixed phase relation with respect to the primary current. This transformer or other regulating device

2 should be designed to cover a plus and minus 70 per cent variation in primary current. The winding 5 of the field coil is energized from the voltage of power circuit 6 through another voltage regulating device, such as a saturable core transformer 8 so that its secondary voltage remains constant and in fixed phase relation to the voltage of power circuits 6, regardless of voltage variations of such source. The voltage regulating device 8 should be able to take care of a voltage variation of plus and minus 10 per cent. Associated with the energizing circuit of coil 5 are phase shifting circuit elements, such as a series reactance 9 and a shunt resistance 10, for causing the field flux through the Hall plate 1 to be 90 degrees out of phase with respect to the voltage supplied to its current input terminals 2 when the power factor of the power circuit 6 is unity. Thus, in Fig. 2, $E_6$ and $I_6$ may represent the voltage and current of power circuit 6 at unity power factor, with the understanding that the length of such vectors may vary considerably, while $\phi_4$ and $E_7$ represent the constant flux through Hall plate 1 and its constant input voltage applied to input terminals 2, such flux and voltage being 90 degrees out of phase when $E_6$ and $I_6$ are in phase. It is assumed that the frequency of source 6 does not vary sufficiently to modify the phase angular relationship described. While the phase shifting mentioned could be otherwise accomplished, it will be evident that the reactance of coil 5 will accomplish some phase lag in itself, and hence, it is a simple matter to add to this phase shift by the expedients described to bring it up to the quadrature relation.

The Hall plate 1, which may be made of germanium, exhibits the Hall effect. When cut by a field flux through its thin dimension and threaded by a current between terminals 2, a voltage will appear across terminals 3 which voltage at any instant will be proportional to the product of field and input current. If the flux and input currents are unidirectional, the output voltage will be unidirectional. If the field is unidirectional and the input current alternating, the output voltage will be alternating. Where both the field flux and input currents are alternating and of the same frequency, the output voltage will be a direct current voltage. In the condition of unity power factor of line 6 there will be no Hall plate output voltage because when there is flux through the Hall plate, there will be no input current and vice versa, since we have shifted the flux to the quadrature relation with respect to the input current. As the power factor of line 6 departs from unity, the quadrature relation of the input flux and current will also shift and the output voltage will appear across output terminals 3 and will be proportional to the inphase components of flux and input current. If the power factor of 6 is lagging, the output voltage of the Hall plate will be of one polarity and if the power factor of 6 is leading, the output voltage of the Hall plate will be of the opposite polarity.

A sensitive direct current instrument 11 is supplied from such output voltage and such instrument is preferably of the zero center type so that its pointer stands at the midscale zero position when the power factor of power circuit 6 is unity, and this zero center point is marked accordingly, that is, 1. The instrument pointer will then deflect in one direction from center in response to lagging power factor, and in the opposite direction in response to leading power factor, and the extent of such deflections will be proportional to the departure of the power factor of line 6 from unity. Hence, the scale of the instrument can be calibrated directly in terms of leading and lagging power factor or phase angle. In a situation where the power factor being measured will always be lagging, a direct current instrument having its zero at one end of the scale may be used and the complete scale graduated in lagging power factor. The same holds true for an all leading power factor situation. In any case where the instrument reads backward, as where it indicates on the lagging power factor scale when the power factor is leading, it is corrected by reversing any one pair of circuit terminals. In the same way the phase angle between any two voltages or currents may be measured by means of our apparatus. If the voltages are constant, the constant voltage regulating means such as the transformers 7 and 8 may be dispensed with. The measuring instrument may have control contacts, if desired.

In the foregoing description we have specified a 90-degree phase relation between the inputs to the Hall plate when the power factor being measured is unity. This will generally be found the preferred arrangement, but in some cases it might be desirable to have a slightly different phase relationship. For example, assume a situation where it was desirable to hold a 90 per cent leading power factor at the point of measurement. The phase shifting elements such as 9 and 10 might then be adjusted to provide for a zero Hall plate output when the power factor of line 6 was near zero and 90 per cent leading. The attendant would then adjust power factor by keeping the zero center type of instrument 11 on zero, and the direction and extent of any departure from zero would tell him the direction and extent of adjustment needed for correction.

In Fig. 2, the field coil 5 of the apparatus is supplied by a constant current in phase with the current flow in the single phase power circuit 6, and the input terminals 2 of the Hall plate are supplied by a constant voltage having a 90-degree phase relation with respect to the voltage of the power circuit. The 90-degree relation is obtained by means of phase shifting circuit elements between the saturated core transformer 8 and the Hall plate input terminals. Thus a resistance 12, an inductance 13, and a resistance 14 are connected in series across the secondary of transformer 8, and the Hall plate 1 is connected across resistance 12 through an inductance 15 and a resistance 16. Suitable values for these circuit elements for 60-cycle circuits are:

12=12,500 ohms
13 and 15 each=6.3 henrys
14 and 16 each=175 ohms

With 120 volts supplied by the secondary of transformer 8, the current through 14 will be 0.0258 ampere and will have a phase angle of 79.3 degrees lag with the line voltage. The current through the Hall plate will be 0.025 ampere and will have a 90-degree lagging relation with respect to the line voltage.

Fig. 3 represents a thermal resistance bridge regulator that may be used in place of a saturated core transformer to maintain a constant voltage or current for the field or Hall plate input circuits of our apparatus. In Fig. 3, 17 may represent an ordinary voltage transformer which supplies a suitable secondary voltage in phase with and proportional to the primary voltage. 18 represents the load supplied and may represent either the field or current input circuit of our Hall plate apparatus. The load 18 is connected across a bridge circuit having similar opposite constant resistance arms 19 and 20. The other opposite arms 21 and 22 are temperature sensitive resistors consisting of tungsten filaments enclosed in sealed tubes containing hydrogen. The several resistances are so related that the greatest current flow is through the resistors 22 and 21 as indicated by the arrow. The resistances 21 and 22 increase with their temperature rise, due to increased current flow and vice versa in a manner to maintain the voltage drop across the load 18 constant over a wide range of voltage applied to the bridge.

In Fig. 4, we have shown our invention as applied to a balanced three phase circuit ABC. The input current circuit of the Hall plate 1 is supplied through a constant voltage device 21 from phases A and C of the power circuit, and the field coil 5 of the Hall device is supplied through a constant current device 22 from an ordinary current transformer 24 from phase B of the power circuit. As is well known, in a balanced three phase system the phase of current of one phase is 90 degrees displaced from the voltage across the other two phases when the power factor of the system is unity. Hence, the D.-C. instrument 11 connected to the output of the Hall plate may be calibrated in power factor as previously explained.

What we declare as new and desire to secure by Letters Patent of the United States is:

1. Power factor measuring apparatus comprising a Hall plate, a coil for producing a field through said plate, current input terminals for said plate, circuits for supplying said field and input terminals by voltages derived from an alternating current source the power factor of which is to be measured, regulating means between said source and circuits for assuring that said supply voltages will be constant, means for causing the Hall plate flux and input current to be 90 degrees out of phase when the power factor to be measured is of a known value at or near unity, output terminals on said Hall plate and a sensitive zero center type of direct current measuring instrument connected to be supplied from said output terminals, said instrument being calibrated with said apparatus in terms of the power factor of said source.

2. Apparatus for measuring the phase angle between two constant alternating current voltages of the same frequency comprising a Hall plate, a coil supplied by one of said voltages for producing a field through said plate, current input terminals on said plate supplied from the other voltage, phase shifting means for causing the field flux and input current of said Hall plate to be 90 degrees out of phase with each other when the phase angle between said voltages is known and is at or near zero, output terminals on said Hall plate, and a sensitive direct current instrument of a type which has its zero center current pointer indicating position at an intermediate scale point supplied from said output terminals and calibrated with said apparatus in terms related to the phase angle between said voltages.

3. Power factor measuring apparatus comprising a Hall plate, an electromagnet for producing a field through said Hall plate, current input terminals on said Hall plate, means for deriving constant alternating current voltages from and in fixed phase relations with the current and the voltage of a power line the power factor of which is to be measured, circuits for supplying such voltages to energize said electromagnet and current input terminals respectively, phase shifting impedance means associated with the electromagnet supply circuit for causing the flux through said Hall plate to be 90 degrees out of phase with the current between its current input terminals when the power factor to be measured is unity, voltage output terminals for said Hall plate, and a zero center type of direct current measuring instrument supplied from said Hall plate output terminals and calibrated with said apparatus in terms of power factor.

4. Apparatus for measuring the power factor of balanced three-phase circuits comprising a Hall plate having a pair of input current terminals, a coil for producing a flux through said Hall plate also having a pair of input current terminals, connections for supplying one pair of said terminals with a current in phase with the voltage across two phases of the three-phase circuit to be metered, connections for supplying the other pair of said terminals by a current in phase with the current in the third phase of the three-phase circuit to be metered, means included in said connections for assuring that the currents supplied to said input terminals will be constant under normal load and voltage varying conditions of such three-phase circuit, and a direct current measuring instrument connected to respond to the output voltage of said Hall plate and calibrated with said apparatus in terms of the power factor of such three-phase circuit.

NORVAL P. MILLAR.
RUSSELL A. WARNER.

REFERENCES CITED

The following references are of record in the file of this patent:

UNITED STATES PATENTS

| Number | Name | Date |
| --- | --- | --- |
| 1,778,795 | Craig | Oct. 21, 1930 |
| 2,314,851 | Barney et al. | Mar. 23, 1943 |